United States Patent [19]
Ryall

[11] Patent Number: 5,407,144
[45] Date of Patent: Apr. 18, 1995

[54] FISHING REEL WITH IMPROVED SPOOL DISCONNECT, ONE-WAY LOCK AND DRAG MECHANISMS

[76] Inventor: James J. Ryall, 814 Acacia Dr., Burlingame, Calif. 94010

[21] Appl. No.: 103,831

[22] Filed: Aug. 9, 1993

Related U.S. Application Data

[63] Continuation of Ser. No. 758,858, Sep. 12, 1991, abandoned.

[51] Int. Cl.⁶ ............................................. A01K 89/02
[52] U.S. Cl. .................................... 242/295; 242/301; 242/318
[58] Field of Search ............... 242/295, 301, 318, 322, 242/317, 298

[56] References Cited

U.S. PATENT DOCUMENTS

| | | | |
|---|---|---|---|
| 2,059,765 | 11/1936 | Adams | 242/295 |
| 2,574,718 | 11/1951 | Swigerd | 242/301 X |
| 3,526,370 | 9/1970 | Arsenault | 242/301 |
| 3,572,607 | 3/1971 | Wilson | 242/318 X |
| 3,806,060 | 4/1974 | Valentine | 242/318 X |
| 3,986,679 | 10/1976 | McMickle | 242/301 X |
| 4,645,137 | 2/1987 | Young | |
| 4,703,902 | 11/1987 | Prouza et al. | |
| 4,733,830 | 3/1988 | Hollander | |
| 4,750,687 | 6/1988 | Sievert | 242/295 |
| 4,966,336 | 10/1990 | Humble | 242/295 |

FOREIGN PATENT DOCUMENTS

| | | | |
|---|---|---|---|
| 27023 | of 1907 | United Kingdom | 242/301 |
| 146750 | 7/1920 | United Kingdom | 242/301 |

Primary Examiner—Daniel P. Stodola
Assistant Examiner—Eileen A. Dunn

[57] ABSTRACT

A fishing reel employing an adjustable, lightweight and smooth operating drag mechanism for producing rotational drag on the rotation of the line spool in one direction. A frame includes a stationary spindle which houses a radially expandable drag adjustable by a drag knob which threads into the spindle. A bushing is rotatably disposed on the spindle and has an internal surface which frictionally engages with a radially expandable brake of the spindle to provide drag on the bushing. A line spool rotatably mounts to the bushing and includes a lock which engage the bushing when the line spool is rotated in a first direction to lock the rotation of the line spool to the rotation of the bushing in the first direction and thereby provide adjustable drag on the rotation of the line spool. The lock allows free rotation in a second reverse direction, such as when reeling line onto the line spool. A line spool retention mechanism is provided on the line spool and allows quick and easy removal and replacement of the line spool. The reel frame, and the preferred lock allows for adaptation to both left and right handed users using a single line spool.

2 Claims, 6 Drawing Sheets

FISHING REEL WITH IMPROVED SPOOL DISCONNECT, ONE-WAY LOCK AND DRAG MECHANISMS

This is a Continuation of application Ser. No. 07/758,858, filed Sep. 12, 1991, now abandoned.

BACKGROUND OF THE INVENTION

The present invention relates generally to fishing reels having a drag mechanism for providing resistance against pulling force on the fishing line such as when playing a fish. More specifically, the invention relates to a fishing reel having an adjustable drag mechanism which provides user-adjustable friction between component parts to vary the drag on line spool rotation in one direction.

Modern fishing equipment is designed to maximize play of the fish to tire the fish during its run after taking the hook. Once the fish has taken the line, it is desirable to use the fishing reel and rod play to tire the fish in the effort to land the fish without causing the fishing line or tackle to fail. With fly fishing equipment, particular emphasis is placed on lightweight fly line, flies and equipment while still providing sufficient equipment strength to maximize play. During its run, a large, powerful fish may cause line to run at extensive rates causing the line spool to rotate at excessive speed even under drag. Fish reels, therefore, must be designed to provide smooth and adjustable drag mechanisms to provide strong resistance to running line during play of an extremely powerful fish.

Prior art drag mechanisms for fly fishing reels are typically disadvantageous because they are heavy, and have many small and complex parts requiring high maintenance and frequent adjustment during wear. A drag mechanism is taught in U.S. Pat. No. 4,733,830, which discloses a drag differential mechanism with brake. The device teaches a cumbersome mechanical apparatus which has many parts and requires frequent adjustment. Other drag mechanisms use devices such as compressible disks or disk brake configurations to provide frictional resistance. These devices, when subject to long durations of use and wear, sometimes develop hard spots of uneven resistance caused by wear upon the frictional engagement surfaces thereby compromising the smoothness of the drag mechanism and cause vibration. Compromised friction in the drag mechanism can cause insufficient drag to stop the fish. Hard spots in the drag mechanism can create undesirable frequency vibration at the leader tippet, or squeaks in the drag mechanism. Additionally, many prior art drag mechanisms require close attention to manufacturing and fabrication tolerances to reduce production hard spots on the sometimes extremely small surface area of the frictional drag or brake surface area. Critical tolerances make the fishing reel extremely costly to produce.

Because of relatively small frictional surface areas in most fishing reel drag mechanisms, many reels lack the adequate drag resistance necessary to play extremely large and powerful fish. Larger reels must be employed to provide necessary drag strength. Larger reels, however, add unwanted weight. As a compromise, some fly reels are constructed to have exposed rims on the spool, sometimes called palming rings, to allow the user to provide rotational frictional between the line spool and the user's palm to increase drag when the mechanical drag mechanism in the reel itself is insufficient or not easily adjustable. These palming rings invite damage and corrosion because they extend outside the frame of the reel, and are therefore exposed to bending or denting when the reel is inadvertently dropped. Furthermore, fishing line can frequently be caught between the palming ring and the reel frame making the device difficult to operate. Palming rings also add undesired weight to the reel.

Therefore, there is a need for an efficient, lightweight and simple drag mechanism which provides the strong, yet easily adjustable, frictional drag necessary to play extremely large and powerful fish without increasing equipment weight, maintenance or complexity.

SUMMARY OF THE INVENTION

The present invention is a fishing reel having line spool release and retention mechanism and a drag mechanism which is superior over prior art devices. Generally, the drag mechanism provides an expandable brake surface to produce frictional engagement between a stationary spindle and a revolving bushing mounted thereon. A line spool is rotatably mounted onto the bushing and configured to freely spin in one direction relative to the bushing and rotationally lock with the bushing in the reverse rotational direction. This one-way locking mechanism locks the rotation of the line spool and the bushing together, thereby subjecting the line spool to the same frictional drag as that imparted between the bushing and the spindle by the expandable brake surface.

The drag mechanism provides a larger frictional surface area relative to prior art devices and employs a simplistic design which is easy to maintain and less expensive to manufacture relative to prior art drag mechanisms.

In the preferred embodiment of the invention, the fishing reel includes a frame having an open side and a ventilated closed side with a centralized hollow spindle extending from the closed side to the open side. The centralized spindle includes a threaded internal bore and transverse cut out seats for retaining brake shoes. The brake shoes are symmetrically displaced about the spindle and provide a portion of the outer surface of the spindle. A drag knob having a tapered actuator threads into the spindle bore from the closed side of the frame. The tapered actuator engages the internal surfaces of the brake shoes, which are also tapered, to cause even, radial displacement of the brake shoes relative to the inner diameter wall surface of the spindle as the drag knob is threaded into the spindle bore. The degree of threaded engagement between the drag knob and the spindle is directly proportional to the radial displacement of the brake shoes, and therefore to the degree of the braking action between the brake shoes and the inner surface of the bushing rotatably disposed on the spindle.

A locking means is provided to lock the rotation of the line spool to that of the bushing in one direction. The locking means is configured to allow free rotation of the line spool in the reverse direction. Therefore, the drag knob acts to directly adjust the frictional drag on the rotation of the line spool in one direction without adversely affecting rotation in the opposite direction.

The locking means is preferably configured having a slip ring type leaf spring disposed on the outer wall of the line spool which faces a flange on the bushing. The leaf spring engages a series of recesses or detents located in a flange as the line spool rotates. The leaf spring provides high tensile strength but has transverse flexibility. The recesses act as stops when the leaf spring on the line spool rotate in one direction and engage a recess. The angle of the leaf spring allows the leaf spring to pass freely over the recesses in the opposite direction. Therefore, in one direction of rotation, the line spool is subject to the drag imparted by on the busing while being allowed to rotate freely in the opposite direction.

Alternatively, the locking means can be configured to employ a rod and ramp structure. In this embodiment, the bushing is configured to have a plurality of ramped recesses or rod seats containing elongated lock rods which radially displace away from the central axis of the bushing as they move up the ramped floor of the recess when subject to rotation by the line spool hub in one rotational direction. Reverse rotation causes the rods to roll down the ramped floor of each recess, thereby removing the frictional engagement between the rods and the internal surface of the line spool hub to allow free rotation in the opposite direction.

In another alternative embodiment, the locking means is configured using a similar leaf spring and recess structure as used in the preferred embodiment, but the relative positions of each are reversed. The recess is on the line spool, and the leaf spring is on the bushing flange. The leaf spring engages the recess on the line spool to lock rotation of the bushing relative to the line spool in one direction, while allowing free rotation in the reverse direction, similar to the embodiment previously described.

Another alternative locking means uses a spring-biased pin secured to the line spool to engage a series of step ramps located on the perimeter of the bushing flange to prohibit rotation in one direction while allowing free rotation in the opposite direction. The step ramps displace the spring biased pin away from the hub axis when revolving in the free spin direction.

Regarding the drag mechanism, the drag between the spindle and the bushing is preferably provided by radially displacing brake shoes which are displaced by a tapered actuator on the drag knob. The threaded engagement between the drag knob and the spindle controls the amount of drag. Alternatively, the drag mechanism can be configured as radially stacked wedges in the spindle to provide a spindle structure which expands in diameter as the wedged portions slide up upon one another during compression along the structure's axis. This wedge construction can be employed in a variety of forms.

Alternative constructions and other features and advantages of the invention will appear from the following description in which the preferred embodiments have been set forth in detail in conjunction with the accompanying drawings.

DESCRIPTION OF THE PREFERRED EMBODIMENT

Figure 1:
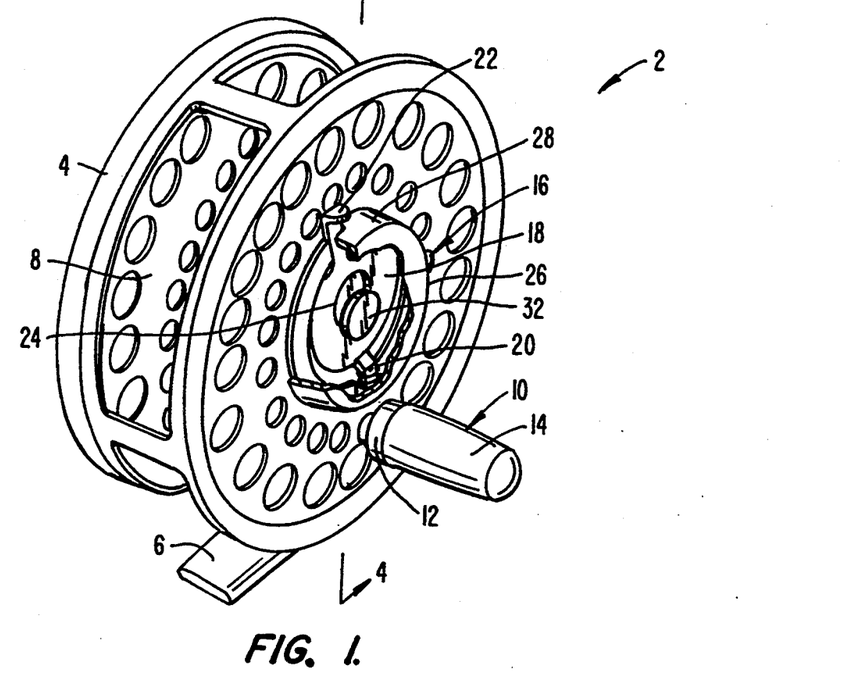
FIG. 1 is a perspective view of the invention illustrating the spool knob partially cut away to show the spool lock retention mechanism used to removably retain a line spool in the reel frame.

Referring to FIG. 1, the invention is shown in the fully assembled condition. Fishing reel 2 includes frame 4 having foot 6 adapted to be securable upon a fishing rod. Frame 4 houses line spool 8 which is rotatably mounted therein. Spool handle 10 is secured to line spool 8 at handle base 12 and includes handle body 14. Body 14 is preferably fabricated from wood, such as rosewood and base 12 is preferably brass. Body 14 is allowed to freely rotate relative to handle base 12 such that when spool handle 10 is used to rotate line spool 10 relative to frame 4, body 14 can rotate independently as necessary to provide a stable gripping surface for the user.

FIG. 1 illustrates line spool retention mechanism 16 shown partially in cut-away view. Line spool retention mechanism 16 functions to releasably secure line spool 8 in frame 4. Line spool retention mechanism 16 includes retention key 18 having spring finger 20, spool lock lever 22 and aperture 24. Line spool retention mechanism 16 is housed within spool knob 26 which is secured to line spool 8. Spool knob 26 is constructed having side wall 28, preferably made of brass, and insert 30 preferably made of wood such as rosewood. The brass and rosewood combination provides a pleasing aesthetic appearance, while resisting corrosion and wear.

Figure 2A:
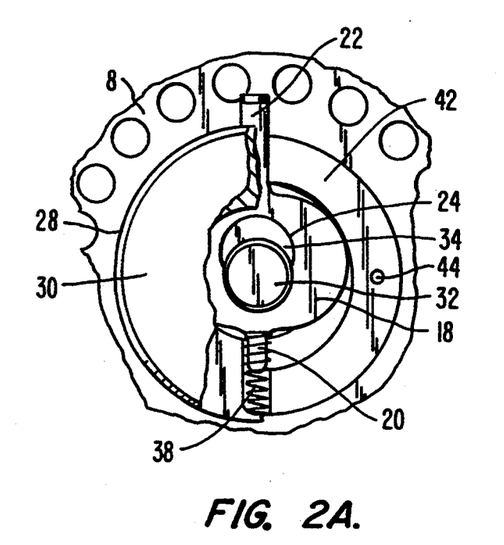
FIG. 2A is a partial plan view of the spool lock retention mechanism shown in FIG. 1 with the spool knob partially cut away to reveal the spring-biased retention key in the locked position.
Figure 2B:
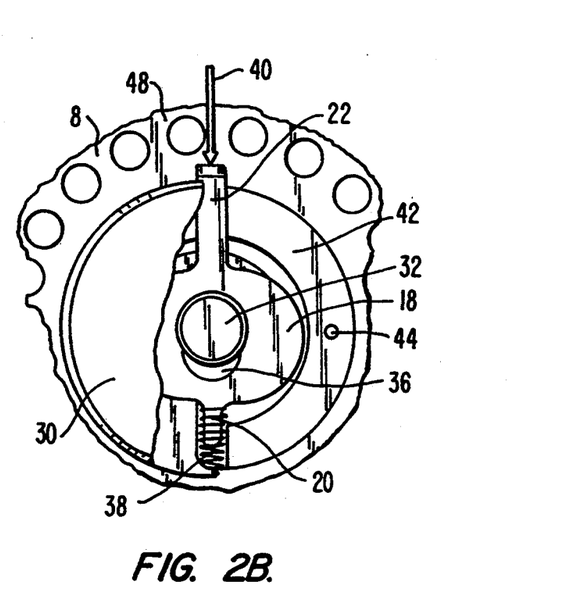
FIG. 2B illustrates the device shown in FIG. 2A with the retention key displaced in the unlocked position to allow insertion or removal of the spool into or out from the spool frame.

Before discussing the rotational and frictional engagement between line spool 8 and frame 4, further discussion of line spool retention mechanism 16 is provided. Referring now to FIG. 2A and FIG. 2B, a more detailed view of line spool retention mechanism 16 is shown. FIG. 2A illustrates line spool retention mechanism 16 in the secured position. Spindle cap 32 is ultimately coupled to frame 4 as will be more fully described below in conjunction with other figures of the spindle. Retention key 18 includes aperture 24 having wide end 34 and narrow end 36. Wide end 34 is configured of sufficient size and shape to allow spindle cap 32 to pass. Narrow end 36 is configured of smaller size and shape to slip around collar portion 106 of spindle cap 32 (not shown) and thereby secure line spool 8 to frame 4 to thereby secure line spool 8 in frame 4 without inhibiting free rotation.

Spring 38 biases retention key 18 to position narrow end 36 about spindle cap 32 in the secured position as shown in FIG. 2A. Force, indicated by arrow 40, applied to spool lock lever 22 by the user compresses spring 38 to bias retention key 18 to an unsecured position whereby spindle cap 32 is free to pass through wide end 34 of aperture 24 as shown in FIG. 2B. In this unsecured position, line spool 8 can be easily removed or inserted into frame 4 as desired. This feature allows the user to exchange line spools to employ different strength fishing lines as desired. In addition, the invention provides for a mechanism whereby line spool 8 can be configured for either right- or left-handed operation as will be described below. Therefore, retention mechanism 16 allows the user to exchange between left and right handed spools as needed. Retention key 18 is retained within key slide 42 secured to line spool 8. Key slide 42 includes fastener hole which is used to retain insert 30 in side wall 28 by suitable fasteners such as brass screws for a suitable alternative. The mechanism can be easily disassembled for cleaning.

Figure 3:
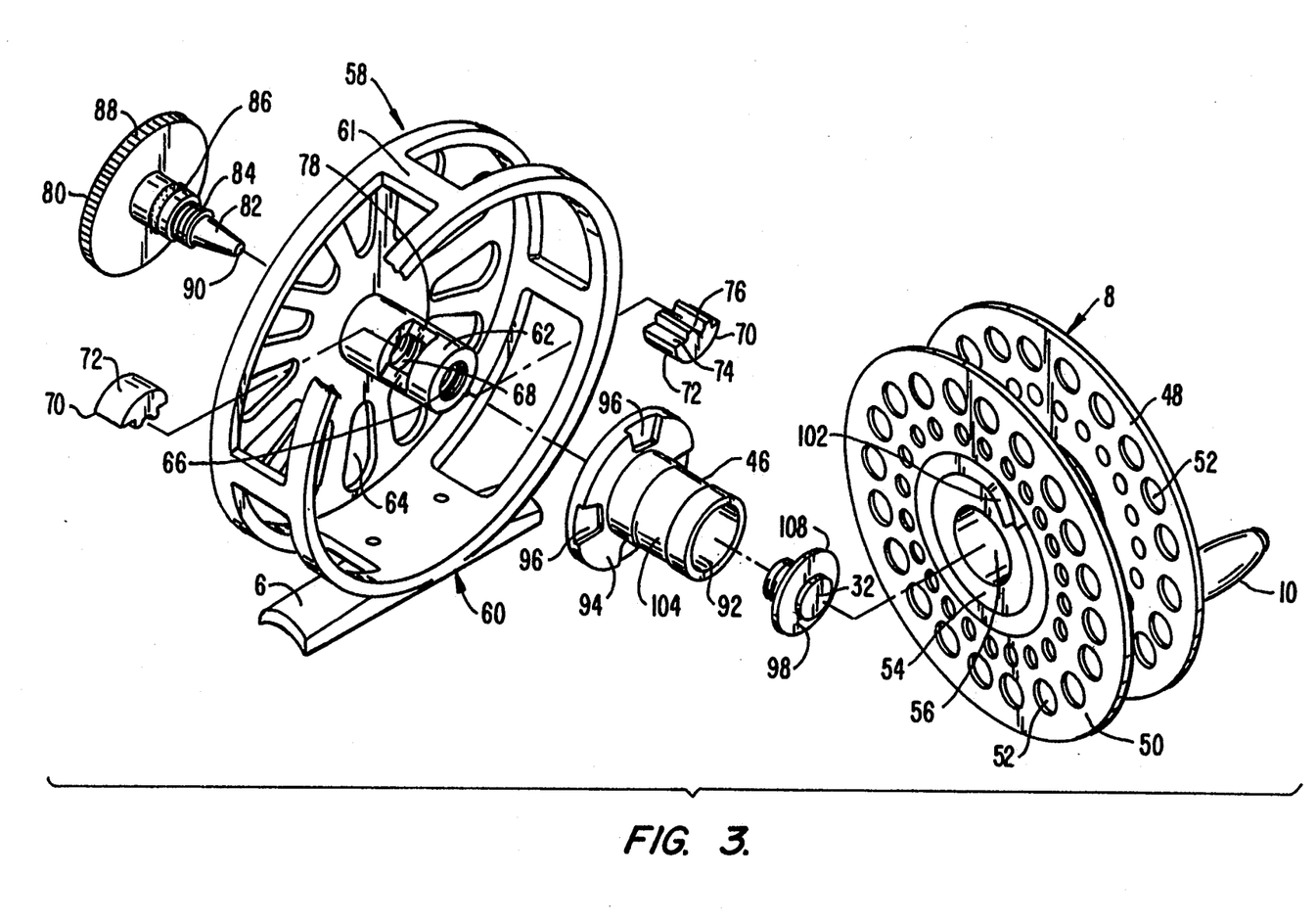
FIG. 3 is an exploded perspective view of the invention showing the component parts of the invention and their relative assembly positions.

The preferred embodiment of the invention is shown in exploded view in FIG. 3. Generally, fishing reel 2 includes frame 4 which houses bushing 46 and line spool 8 on spindle 62. Line spool 8 includes outside wall 48 and inside wall 50. Line spool retention mechanism 16, previously described, is mounted onto outside wall 48. Inside wall 50 and inside wall 48 each include multiple cutouts 52 to reduce weight and provide ventilation of line spool 8. Inside wall 50 and outside wall 48 are separated by spool hub 54 having bore 56. Preferably, line spool 8 is machined from a solid piece of hard anodized 6061-T6 aluminum to provide light weight and strength. Alternatively, other materials could be used.

Frame 4 is also preferably machined from a single piece of hard anodized 6061-T6 aluminum and constructed to have closed end 58, open end 60 and spindle 62. Preferably, frame 4 is made generally cylindrical in shape as illustrated in FIG. 3 and includes a plurality of radial vents 64 cut out from closed end 58 to further enhance ventilation of line spool 8 and decrease weight. Closed end 58 and open end 60 are connected by posts 61.

Spindle 62 extends from closed end 58 towards open end 60 and includes threaded spindle bore 66. Spindle 62 also houses radially displaceable drag means, preferably brake shoes 70 to impart frictional engagement between spindle 62 and bushing 46. In the preferred embodiment, spindle includes two brake seats 68, each configured to receive brake shoe 70. Brake shoe 70 is fabricated from brass and is constructed having smooth outer surface 72, shoulder 74 and tapered channel 76. Brake shoe 70 is positioned in brake seat 68 in the assembled condition having shoulder 74 engaging seat wall 78 with the tapered channel 76 facing towards central axis of spindle 62.

Drag knob 80 threadably engages into spindle 62 and includes tapered actuator 82, threads 84, sealing ring 86 and gripping surface 88. Threads 84 are configured to threadably mate into spindle 62. Tapered actuator 82 tapers downwardly from threads 84 to tip 90. This taper coincides with the shape of tapered channel 76 of brake shoe 70. As such, tapered actuator 82 contacts tapered channel 76 of brake shoe 70 as drag knob 80 is threaded into spindle 62. This engagement causes brake shoe 70 to displace radially to cause drag as will be more fully described below.

Bushing 46 is sized to rotatably mount on spindle 62 to provide free rotation of bushing 46 about spindle 62 while minimizing play and wobble. Bushing 46 includes bushing bore 92 and flange 94. Bushing 46 is preferably fabricated from an acetal resin such as DERLIN ® (a registered trademark of E. I. du Pont de Nemours & Co., Inc.) or a suitable plastic or nylon material which withstands heat while providing long frictional wear against brake shoe 70. Flange 94 includes at least one, but preferably four, recesses 96. When in the assembled condition, bushing 46 slides onto spindle 62 such that flange 94 abuts closed end 58 of frame 4 and recesses 96 face towards open end 60. Spindle cap 98 includes threads 100 which thread spindle cap 98 into spindle 62 to retain bushing 46 thereon and prevent bushing 46 from travelling longitudinally along the axis of spindle 62 by rim 108.

In the assembled condition, leaf spring 102 secured to inside wall 50 of line spool 8, angles out to engage flange 94 of bushing 46 and lock rotation of line spool 8 to the rotation of bushing 46 in one direction by engagement with recess 96. Leaf spring 102 passes freely over recesses 96 when rotated in the reverse direction. Line spool 8 rotatably mounts on bushing 46 through spool bore 56. Bushing 46 can be made having a slightly recessed central portion 104 to minimize surface friction between bushing 46 and spool bore 56.

Figure 4:
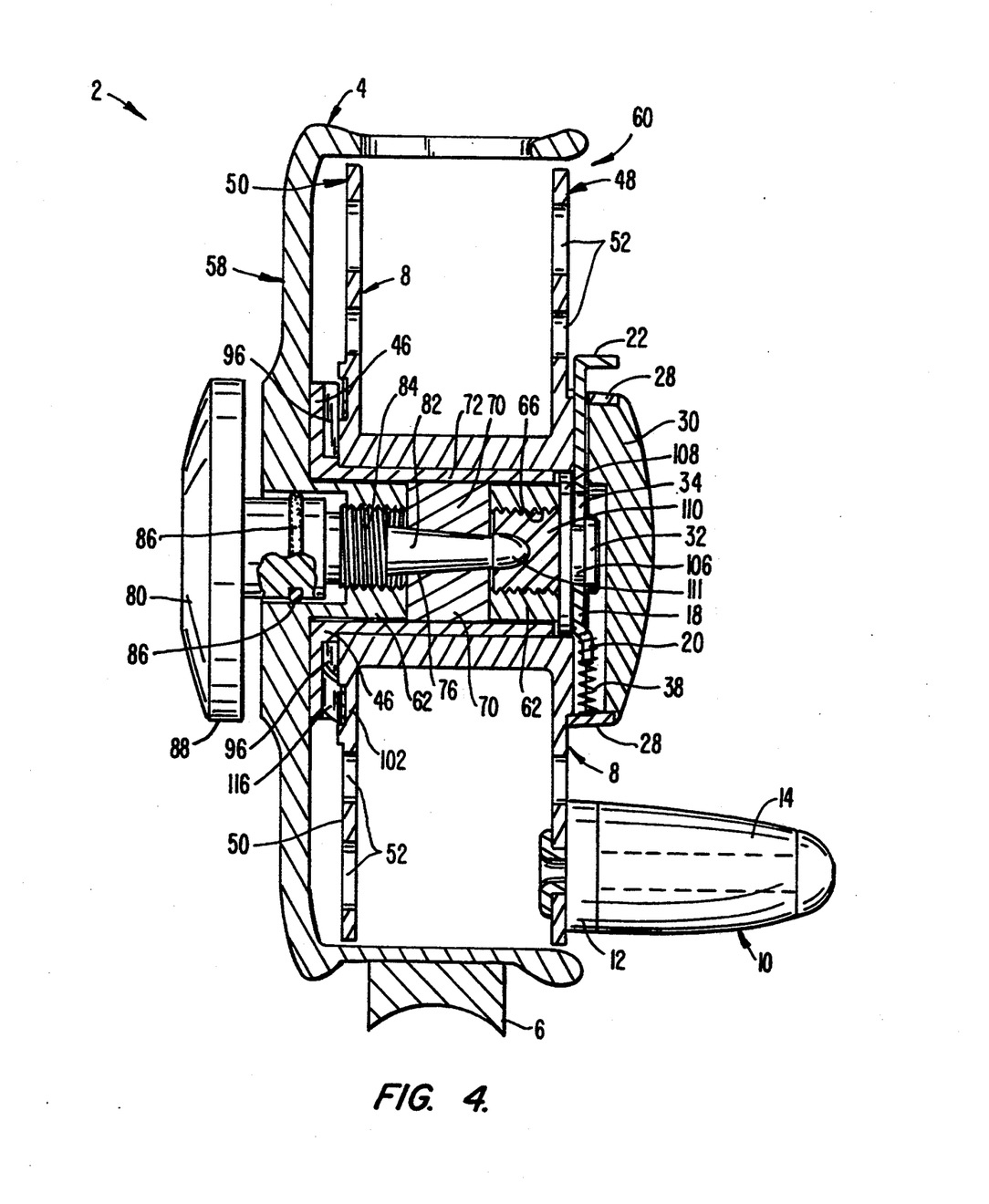
FIG. 4 is a cross-sectional view along line 4—4 of FIG. 1 illustrating the preferred embodiment of the invention in the fully assembled condition.

Fishing reel 2 is shown in the fully assembly condition in FIG. 4. Line spool 8 is retained in frame 4 by retention key 18 engaging spindle cap 32 about collar 106. Spring 38 biases retention key 18 against collar 106 to retain line spool 8 in the secured condition illustrated. Spindle cap 32 includes rim 108 which secures bushing 46 onto spindle 62. Spindle cap 32 also includes threaded body 110 which engages the threads on spindle bore 66 to secure the spindle assembly together and includes cavity 111 to allow travel of tapered actuator 82.

Drag knob 80 threadably engages into spindle 62 with threads 84. Sealing ring 86, made of rubber or other suitable material, provides a seal between drag knob 80 and frame 4 to prevent dirt and moisture from entering into the spindle assembly. Tapered actuator 82 drives brake shoes 70 by contact with tapered channel 76 to radially displace brake shoes 70 outwardly from spindle 62 where outer surface 72 frictionally engages the inside surface of bushing 46 to cause drag thereon. As a result, threaded engagement of drag knob 80 directly corresponds with the amount of radial displacement of brake shoes 70 and therefore directly adjusts the frictional drag between bushing 46 and brake shoes 70. Rotation of drag knob 80 into spindle 62 increases frictional engagement between brake shoe 70 and bushing 46 thereby impeding rotation of bushing 46 in either direction.

Line spool 8 is rotatably mounted on bushing 46. Leaf spring 102 extends outwardly from inside wall 50 of line spool 8 to contact flange 94 of bushing 46. Flange 94 includes recesses 96 which act as stops against leaf spring 102 in the rotational direction generally described as towards the front of the tip 116 of leaf spring 102. The engagement between leaf spring and recess 96 locks the rotation of line spool 8 with the rotation of bushing 46 when revolved in this direction and subjects line spool 8 to the drag on bushing 46. In the reverse direction, leaf spring 102 deflects over recess 96 as line spool 8 is revolved around bushing 46 due to its angled configuration. Preferably, leaf spring 102 is made of plate metal such as brass in a slip-ring configuration having a high tensile strength while allowing lateral flexibility to deflect when line spool 8 was revolved in the unlocking direction. This deflection creates a series of audible clicks as leaf spring 102 deflects in and out of passing recesses 96. When drag knob 80 is adjusted to remove frictional engagement between brake shoes 70 and bushing 46, line spool 8 is allowed to freely revolve in both the locking or unlocking direction of rotation due to the freedom of revolution of bushing 46. A wide range of selectable adjustment is therefore available by incremental threading of drag knob into spindle 62 as desired by the user. The range of motion of rotational threading of drag knob 80 allows the user to virtually lock bushing 46 to spindle 62 when a very high degree of drag is required. This feature, along with the wide range of selectable adjustment, allows the user to freely adjust the drag mechanism both before and during actual play on the fishing line.

The direction of engagement between leaf spring 102 and recess 96 can be selected by appropriate angling of leaf spring 102 to accommodate either right or left-handed users. Providing two line spools, each with oppositely directed leaf spring bends, allows for quick interchangeability between left and right-handed users by changing the direction of locking rotation.

Figure 5:
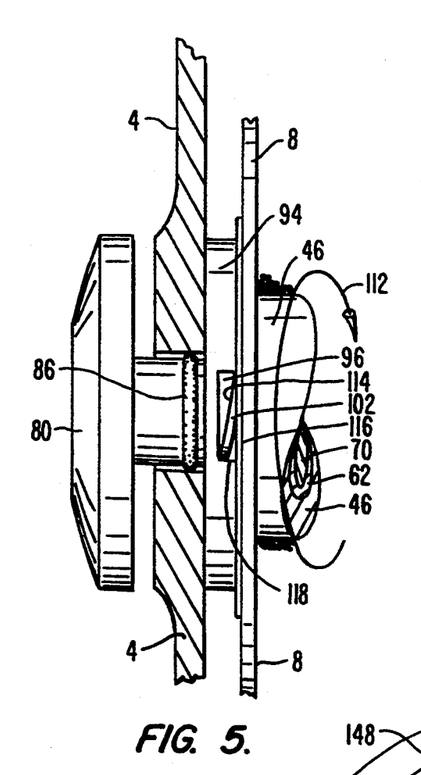
FIG. 5 is a partial section view of the device shown in FIG. 4 illustrating the leaf spring engaged in the bushing recess to lock the rotation of the line spool to the rotation of the bushing in one direction.

FIG. 5 provides a more detailed view of the locking rotational engagement between line spool 8 and bushing 46. Leaf spring 102 extends outwardly from line spool 8 along an angle approximately 45°, as illustrated. When line spool 8 is revolved about spindle 62 in the direction indicated by arrow 112, leaf spring 102 can freely deflect out of recess 96 by riding along back 114 of leaf spring 102. In this direction, leaf spring 102 deflects inwardly towards line spool 8 and rides up along the surface of flange 94. As revolution continues, leaf spring 102 will pass each recess 96 where its natural bias will again cause leaf spring 102 to spring into, and pass out of, each recess 96. This movement creates an audible click each time leaf spring 102 crosses recess 96. When a plurality of recesses 96 are included in flange 94, multiple clicks will be audible for each revolution of line spool 8 as fishing line 115 is wound onto line spool 8.

In a direction of revolution opposite that indicated by arrow 112, leaf spring 102 will again spring into recess 96 as line spool 8 revolves. However, tip 116 of leaf spring 102 engages the side wall 118 of recess 96 to stop rotational progress of line spool 8. Due to the high tensile strength of leaf spring 102, leaf spring 102 mechanically locks revolution of line spool 8 in this direction to rotational travel of bushing 46. As previously described, bushing 46 is subject to the drag forces of the drag means in the spindle assembly, which in the preferred embodiment are brake shoes 70 as previously described. Therefore, when line spool 8 is configured to lock directional rotation with the bushing, presumably in the line-out rotational direction, the user can adjust drag to play a fish as desired. In the winding up, or reverse direction indicated by arrow 112, line spool 8 is not inhibited by frictional rotation of the drag means.

Figure 6:
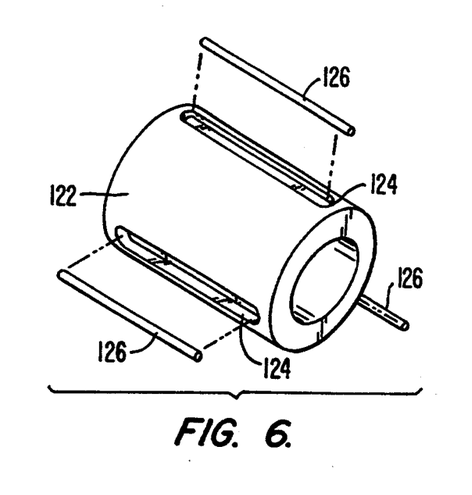
FIG. 6 is a perspective view of an alternative locking means used to lock the rotation of the line spool to the rotation of the bushing in one direction, the locking means having a bushing with ramped recesses for receiving rolling lock rods.
Figure 7:
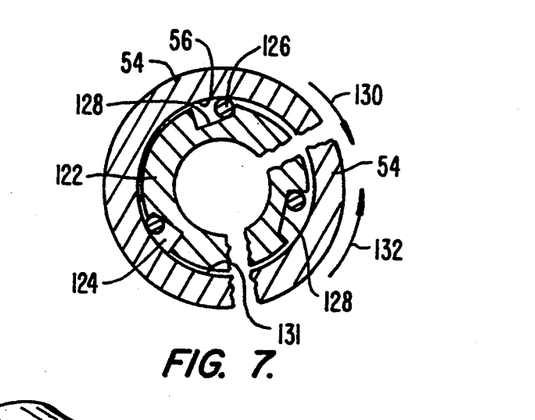
FIG. 7 is a cross-sectional view of the bushing shown in FIG. 6 illustrated disposed in the inside of the line spool hub with the lock rods providing frictional engagement between the bushing and the line spool when the line spool is rotated in one direction.

FIG. 6 illustrates an alternative locking mechanism to lock the rotation of a line spool to the bushing. This embodiment is suited for large sized reels. In this embodiment, bushing 122 is shown having a plurality of rod seats 124 which each house a lock rod 126. As shown in FIG. 7, each lock rod 126 is retained in a rod seat 124 when bushing 122 is housed within spool hub 54. Each rod seat 124 has a ramped floor 128. When spool hub 54 rotates in the direction depicted by arrow 130, lock rod 126 is pushed up ramped floor 128 by contact with spool bore 56 where it wedges between ramped floor 128 and inside surface 131 of spool bore 56. This causes spool hub 54 and bushing 122 to lock together by frictional engagement when spool hub is rotated in the locking direction of arrow 130. Alternatively, when spool hub 54 revolves in the direction of arrow 132, lock rods 126 are allowed to travel down ramped floor 128 and disengage from wedged frictional engagement with inside surface of spool bore 56. Lock rods 126 are made of sufficient length to enhance contact between lock rods 126 and spool bore 56, preferably of a length close to the length of spool bore 56. Bushing 122 can be reversed in position within spool hub 54 to change between left and right handed spool rotation.

Figure 8:
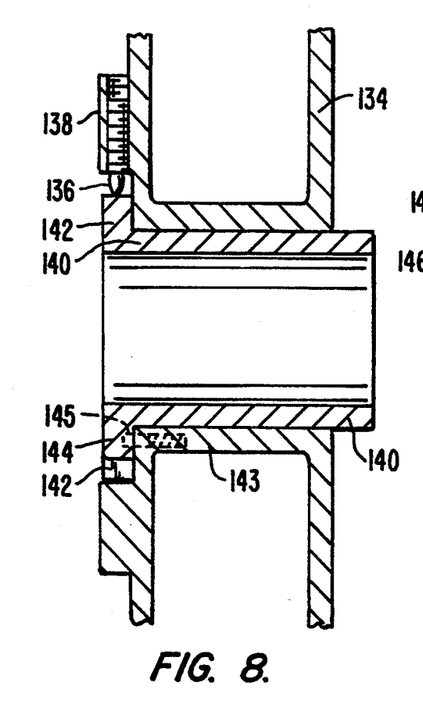
FIG. 8 is an alternative embodiment of the locking means showing a spring-biased pin mounted on the line spool wall which engages step ramps positioned on the flange of the bushing to lock rotation of the line spool to the bushing in one direction of rotation.
Figure 9:
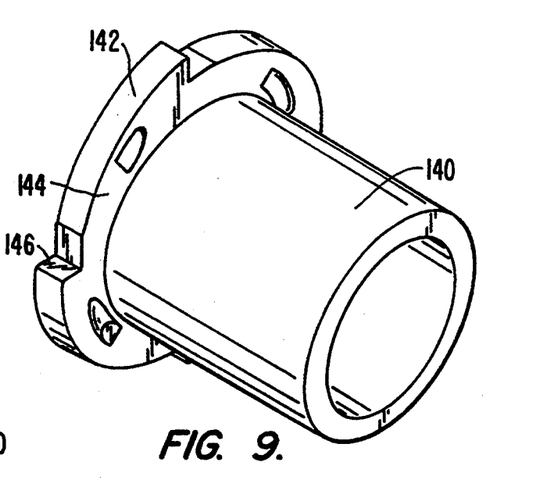
FIG. 9 is a perspective view of the bushing used in the alternative embodiment illustrated in FIG. 8.

Another alternative means for locking the rotation of the line spool to the rotation of the bushing is illustrated in FIGS. 8-9. In this embodiment, line spool 134 includes pin 136 which is spring biased away from and retained in pin housing 138. Bushing 140 is configured having a plurality of step ramps 142 about the perimeter of the flange 144 as can be seen in FIG. 9. Each step ramp includes stop 146 which abuts pin 136 to lock rotation of line spool 134 to the rotation of bushing 140. In the reverse rotational direction, pin 136 is allowed to ride up step ramp 142 and over and down stop 146 during rotational travel. As pin 136 passes each stop 146, an audible click is produced. Pin 136 can be positioned at an angle generally perpendicular to the longitudinal axis of bushing 140 as illustrated or positioned parallel to the axis by housing in hub 143 as indicated by pin 145 shown in phantom.

Figure 10:
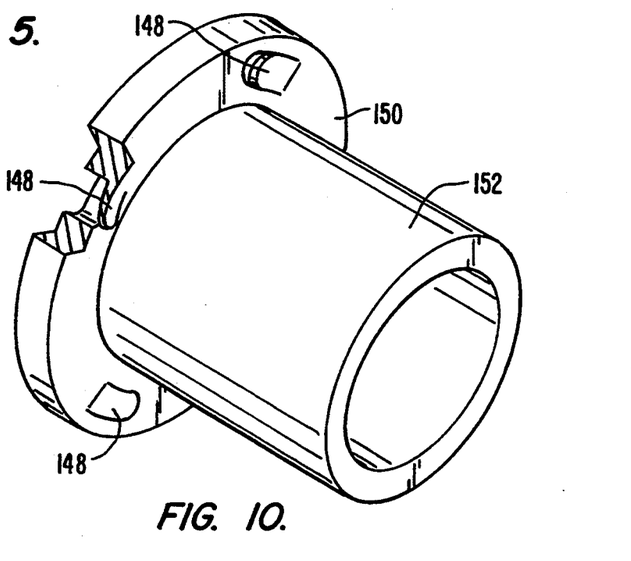
FIG. 10 is a perspective view of the bushing used in an alternative embodiment of the locking means where the bushing has inwardly extending leaf springs which engage recesses located on the outer wall of the line spool to lock rotation therebetween in one direction.

FIG. 10 illustrates an alternative embodiment of the locking means having engaging springs 148 molded with and made integral with flange 150 of bushing 152. Suitable recesses can be cut in the line spool (not shown) to provide a locking mechanism similar in function to the preferred embodiment to cause line spool and bushing 152 to lock in rotation in one direction while allowing free rotation in the reverse direction.

Figure 11:
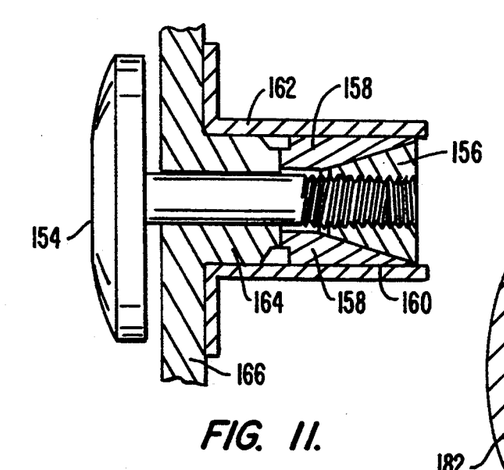
FIG. 11 is a side view of an alternative adjustable friction means shown partially in section where the drag knob threads into a wedged brake plunger to pull deposing wedged surfaces against one another and thereby radially displace the outer surface thereof.
Figure 12:
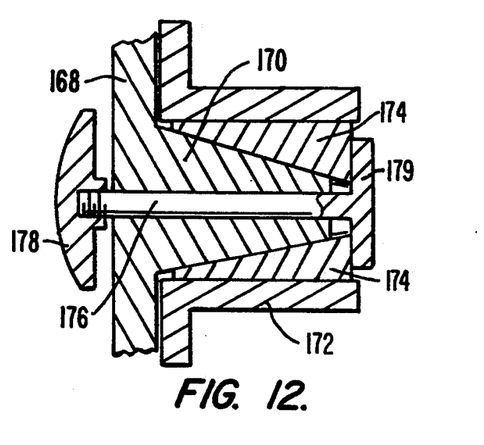
FIG. 12 is a side view shown partially in section of another alternative embodiment of the friction means where the drag knob threads onto a pull rod to overlap deposing wedges which expand radially to cause friction.
Figure 13:
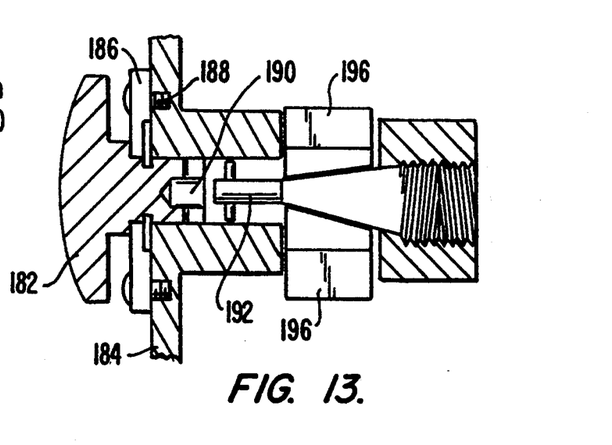
FIG. 13 is a side view of another alternative embodiment of the friction means shown partially in section having a stationary knob and a tapered plunger used to radially displace drag shoes.

FIGS. 11 through 13 illustrate alternative spindle assembly drag means to provide frictional drag engagement between the spindle assembly and the bushing. As shown in the embodiment of FIG. 11, drag knob 154 threads into a cone shaped plunger 156 to radially displace tapered brake shoes 158 and provide frictional engagement between outer surface 160 of brake shoe 158 and the inner surface of bushing 162, which is mounted on spindle 164 extending out from frame 166.

In another embodiment shown in FIG. 12, frame 168 includes spindle 170 which is tapered as it extends into bushing 172. Tapered brake shoes 174 are disposed between spindle 170 and bushing 172. A pull rod 176 is provided having a base 179 which abuts brake shoes 174. Drag adjustment is made by varying the threaded engagement of drag knob 178 onto threaded portion 180 of pull rod 176. Increasing threaded engagement pulls pull rod 176 towards drag knob 178, thereby forcing brake shoes 174 to ride up spindle 170 and radially displace against bushing 172, providing frictional drag.

FIG. 13 illustrates another alternative construction of the drag means. In this embodiment, knob 182 is made stationary relative to frame 184 by securing means 186. Securing means 186 are fastened onto frame 184 by fasteners 188. Knob 182 includes key hole 190 which receives key 192 located on the end of tapered plunger 194. Tapered plunger 194 threads into spindle 198 to provide adjustable friction between brake shoes 196 and bushing (not shown) disposed on spindle 198. Removal of securing means 186 allows the user to use knob 182 to engage key hole 190 with key 192 to adjust the radial displacement of brake shoes 196.

Figure 14:
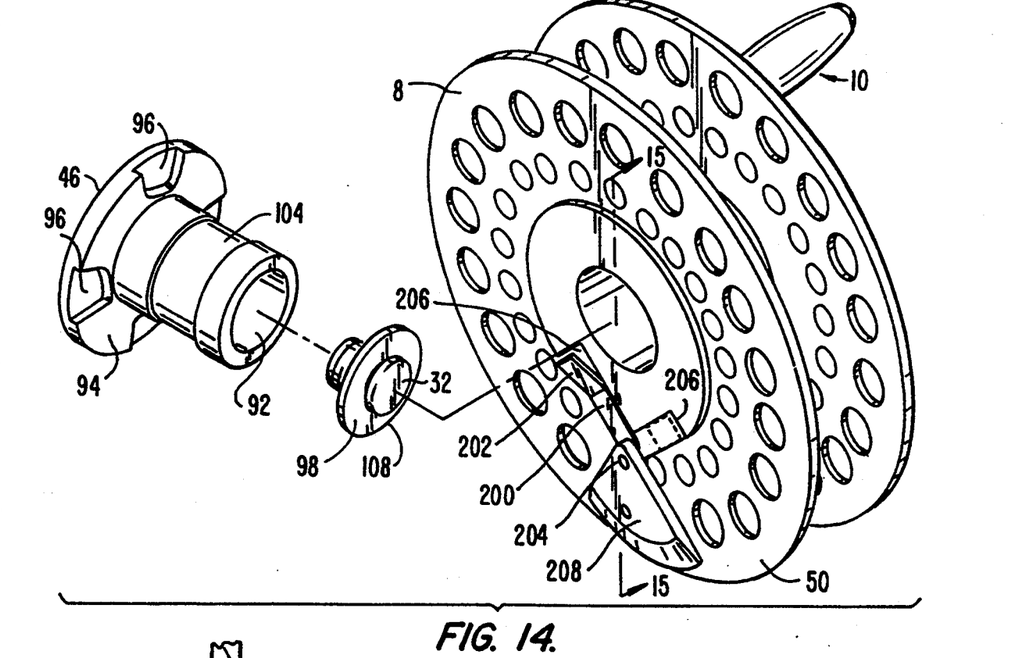
FIG. 14 is the preferred embodiment of the locking means for a universal right and left handed spool having an adjustable position foot spring secured to the line spool, a rear-mounted line spool balance, and the foot spring configured to be convertible between right and left hand line spool operation.
Figure 15:
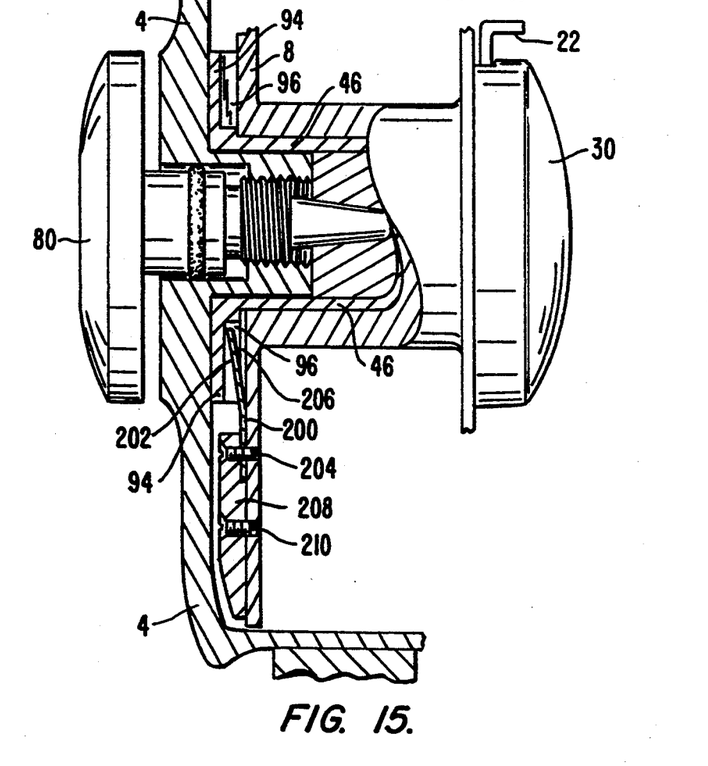
FIG. 15 is a partial cross-sectional view of the device shown in FIG. 14 along line 15—15 illustrating the foot spring engaged in the bushing recess to lock the rotation of the line spool to the bushing in one direction, the counterbalance shown secured to the line spool to provide dynamic balance thereof.

FIG. 14 and FIG. 15 illustrate the preferred embodiment of the locking means between line spool and bushing when the fishing reel is configured to have a single line spool adaptable to locking rotation for both between left- and right-handed users. This structure allows the line spool to be configured to lock with the bushing when rotated in a selected direction to allow the user to configure device to lock in the line-out direction for right-handed users or the line-out direction for left-handed users. Obviously, the line out rotational direction will change depending on the right- or left-handed configuration. FIG. 14 illustrates line spool 8 having handle 10 as previously described. Bushing 46 and spindle cap 98 are also constructed in accordance with the previous descriptions. In this embodiment, however, foot spring 200 replaces leaf spring 102 previously described. Foot spring 200 is generally linear having angled tip 202 which functions in the equivalent manner of that described with leaf spring 102. Foot spring 200 can be made of plastic or metal and is secured on line spool 8 by screw 204. The position of foot spring 200 can be changed between either arm of V-shaped groove 206 which acts as a seat for foot spring 200. When foot spring 200 is positioned in one arm of groove 206, tip 202 locks rotation of line spool 8 with the rotation of bushing 46 in the direction generally towards tip 202 and allows free rotation in the opposite direction. To lock the rotation of line spool 8 to that of bushing 46 in the opposite direction, foot spring 200 is repositioned in the opposite arm of groove 206. Repositioning can be made by removing line spool 8 from frame 4 via the spool retention mechanism 16 previously described, loosening screw 204 and rotating foot spring 200 out and around screw 204 until positioned in the desired arm of groove 206. FIG. 15 shows a cross-sectional view along line 15—15 indicated in FIG. 14 of the lock means just described. As illustrated, tip 202 of foot spring 200 engages recess 96 to lock rotation of line spool 8 with bushing 46.

FIGS. 14-15 also illustrate the preferred embodiment of rear-mounted spool counter balance 208. When a fish is running, line spool 8 may revolve at extremely high speeds as line is being pulled out from the spool. Dynamic balance of line spool 8 is therefore extremely important. Although the construction of line spool is generally symmetrical, spool handle 10 and related mounting hardware throws off the rotational balance of line spool 8. Therefore, it is desirable to have a counter balance affixed to line spool 8. Preferably, spool counter balance 208 is secured to inside wall 50 of line spool 8 using two screws 204, 210. Spool balance is made of stainless steel, brass or suitable material, and is shaped to conform to the inside configuration of frame 4 while providing sufficient rotational clearance.

Spool balance 208 is preferably pie-shaped to evenly disperse mass to provide a relatively thin, smooth and aesthetically pleasing design. This mounting location positions spool balance on the inside protected portion of frame 4 to reduce the potential for damage or snagging on the user's clothes as is experienced with many prior art counterbalances mounted on the external side of line spools. It should be noted that regardless of the locking means employed in the particular embodiment of reel 2, spool balance 208 is preferably used. However, in the particular right- and left-handed adjustable embodiment shown in FIG. 14-15, screw 204 has the added benefit of doubling in function to both retain foot spring 200 and spool balance 208. The foregoing description of the preferred embodiments of the invention have been presented for purposes of illustration and description. It is not intended to be exhaustive or to limit the invention to precise form disclosed and obviously many modifications and variations are possible in light of the above teaching. The embodiments chosen and described in this description were selected to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A fishing reel, comprising:
   a frame having a foot adapted for attachment to a fishing rod, an open side, a closed side and a centralized fixed cylindrical spindle assembly having a longitudinal axis and an internal bore;
   a bushing rotatably mounted on said spindle;
   a removable line spool having a first outer wall, a second outer wall and a hub disposed therebetween, the hub configured to rotatably mount on the bushing;
   means for locking the rotation of said line spool to the rotation of the bushing in a first direction while allowing free rotation of the line spool in a second, reverse direction;

means for providing friction between the spindle assembly and the bushing to thereby provide frictional drag between said line spool and said spindle in said first direction;

wherein the friction means includes a brake shoe and a drag knob, the drag knob rotatable between a first position and a second position wherein rotation between said first position and said second position causes the brake shoe to displace radially away from the longitudinal axis of the spindle and frictionally engage the bushing;

wherein said drag knob threadably mounts to the internal bore of the spindle and includes a tapered actuator, the tapered actuator configured to abut the brake shoe and radially displace the brake shoe away from the longitudinal axis of the spindle;

wherein the locking means includes an outwardly spring biased member and a stop surface, the spring biased member configured to engage the stop surface and lock the movement of the spring biased member to the movement of the stop surface in a first direction and allow unlocked independent movement of the spring biased member relative to the stop surface in a second direction;

wherein the spring biased member is mounted to the line spool and extends outwardly therefrom, the stop surface positioned on a flange extending out from the bushing and located in a rotational path of the spring biased member; and wherein the spring biased member includes a plate spring having a tip angled away from the line spool at an angle.

2. The fishing reel of claim 1, further comprising a seat groove configured to retain the plate spring, the plate spring secured to the line spool with a removable fastener and pivotable between a first position and a second position, the first position locking the rotation of the line spool to the rotation of the bushing wherein the line spool is rotated in the first direction while allowing generally free rotation of the line spool to the bushing in the second direction.

* * * * *